US012614754B2

(12) United States Patent 
Koketsu et al.

(10) Patent No.: US 12,614,754 B2 
(45) Date of Patent: Apr. 28, 2026

(54) METHOD FOR PRODUCING SOLID ELECTROLYTE SHEET

(71) Applicant: HONDA MOTOR CO., LTD., Tokyo (JP)

(72) Inventors: Seiichi Koketsu, Wako (JP); Takehiro Fukushima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 94 days.

(21) Appl. No.: 18/591,109

(22) Filed: Feb. 29, 2024

(65) Prior Publication Data

US 2024/0332606 A1 Oct. 3, 2024

(30) Foreign Application Priority Data

Mar. 31, 2023 (JP) ................................. 2023-059327

(51) Int. Cl.
H01M 10/0562 (2010.01)
H01M 10/058 (2010.01)

(52) U.S. Cl.
CPC ..... *H01M 10/0562* (2013.01); *H01M 10/058* (2013.01); *H01M 2300/0068* (2013.01); *H01M 2300/0094* (2013.01)

(58) Field of Classification Search
None
See application file for complete search history.

(56) References Cited

U.S. PATENT DOCUMENTS

2022/0006118 A1 1/2022 Yan et al.

FOREIGN PATENT DOCUMENTS

| JP | 2020-024860 | 2/2020 |
| JP | 2020-038761 | 3/2020 |
| JP | 2021-163759 | 10/2021 |
| JP | 2022-506297 | 1/2022 |
| JP | 2022-151241 | 10/2022 |

OTHER PUBLICATIONS

LiaDia Designs "Can You Use Fabric in Resin? Yes! Easy Way to Make Beautiful Epoxy Resin Art Pieces" Apr. 17, 2022 Youtube ( https://www.youtube.com/watch?v=yR5ygFbVX5c) (Year: 2022).*
Japanese Notice Of Allowance for Japanese Patent Application No. 2023-059327 mailed Dec. 24, 2024.

* cited by examiner

*Primary Examiner* — Jacob T Minskey
*Assistant Examiner* — Adrien J Bernard
(74) *Attorney, Agent, or Firm* — Amin, Turocy & Watson, LLP

(57) ABSTRACT

The method for producing a solid electrolyte sheet according to the present invention comprises: a first step of applying a first slurry containing a solid electrolyte to a substrate to form a first uncured product; a second step of drying the first uncured product on the substrate to form a first solid electrolyte layer; a third step of applying a second slurry to an upper surface of the first solid electrolyte layer to form a second uncured product; a fourth step of digging a sheet-formed three-dimensional structure into the second uncured product; and a fifth step of drying the second uncured product that has entered inside the three-dimensional structure and the second uncured product that is present on the three-dimensional structure to form a second solid electrolyte layer inside and on the three-dimensional structure, thereby obtaining a solid electrolyte sheet with the second solid electrolyte layer filling inside of the three-dimensional structure.

4 Claims, 1 Drawing Sheet

2(3,4)
1

5(6)
4
1

7
5(6)
4
1

10

8
7
4
1

100

120
110

METHOD FOR PRODUCING SOLID ELECTROLYTE SHEET

CROSS-REFERENCE TO RELATED APPLICATION

Priority is claimed on Japanese Patent Application No. 2023-059327, filed Mar. 31, 2023, the content of which is incorporated herein by reference.

BACKGROUND OF THE INVENTION

Field of the Invention

The present invention relates to a method for producing a solid electrolyte sheet.

Description of Related Art

A solid-state battery is composed of a laminate including a positive electrode layer, a solid electrolyte layer, and a negative electrode layer. As the solid electrolyte layer, for example, a solid electrolyte sheet filled with a solid electrolyte is used. The solid electrolyte sheet has: a sheet-formed three-dimensional structure made of nonwoven fabric or the like, which is placed at a middle position in the thickness direction and has its inside filled with a solid electrolyte; and a solid electrolyte layer formed to cover the upper and lower surfaces of the three-dimensional structure, respectively.

Conventionally, a solid electrolyte sheet has been produced by a method in which the three-dimensional structure is immersed in a slurry containing a solid electrolyte to fill the inside of the three-dimensional structure with the slurry, and then the slurry is dried to form a solid electrolyte sheet. However, this method has a problem in that the mass productivity of the solid electrolyte sheet and the safety in production thereof are poor. In order to ensure the mass productivity of the solid electrolyte sheet and the safety in production thereof, it is necessary to obtain a solid electrolyte sheet having the same quality as that obtained by the method of immersing the three-dimensional structure in the slurry, while using the method of coating the three-dimensional structure with the slurry.

Regarding the method of coating the three-dimensional structure with the slurry, a method is known which applies the slurry twice so as to enable the three-dimensional structure to be placed at a middle position in the cross-sectional direction, and can provide a solid electrolyte sheet having the same quality as that obtained by the method of immersing the three-dimensional structure in the slurry (for example, see Japanese Patent Application Unexamined Publication No. 2022-151241).

SUMMARY OF THE INVENTION

However, the conventional technique described above is not free from problems such as occurrence of wrinkles in the three-dimensional structure such as a nonwoven fabric, bubbles generated along the wrinkles, and breakage due to the three-dimensional structure being caught in a die coater. Therefore, there is room for improvement.

The present invention provides a method for producing a solid electrolyte sheet that not only suppresses occurrence of wrinkles in a three-dimensional structure such as a nonwoven fabric and bubbles generated along the wrinkles, but also suppresses breakage of the three-dimensional structure. This in turn contributes to energy efficiency.

The embodiments of the present invention have the following configurations.

[1] A method for producing a solid electrolyte sheet filled with a solid electrolyte, the method comprising:
a first step of applying a first slurry containing a solid electrolyte to a substrate to form a first uncured product of the first slurry;
a second step of drying the first uncured product on the substrate to form a first solid electrolyte layer;
a third step of applying a second slurry to an upper surface of the first solid electrolyte layer to form a second uncured product of the second slurry;
a fourth step of digging a sheet-formed three-dimensional structure into the second uncured product; and
a fifth step of drying the second uncured product that has entered inside the three-dimensional structure and the second uncured product that is present on the three-dimensional structure to form a second solid electrolyte layer inside and on the three-dimensional structure, thereby obtaining a solid electrolyte sheet with the second solid electrolyte layer filling inside of the three-dimensional structure.

The method for producing a solid electrolyte sheet according to the present invention involves digging a sheet-formed three-dimensional structure into a second uncured product of a second slurry containing a solid electrolyte, and drying the second uncured product that has entered inside the three-dimensional structure and the second uncured product that is present on the three-dimensional structure to form a second solid electrolyte layer inside and on the three-dimensional structure, thereby obtaining a solid electrolyte sheet with the second solid electrolyte layer filling inside of the three-dimensional structure, whereby it is possible to not only suppress occurrence of wrinkles in a three-dimensional structure such as a nonwoven fabric and bubbles generated along the wrinkles, but also suppress breakage of the three-dimensional structure.

[2] The method according to [1], wherein in the fourth step, the three-dimensional structure is allowed to dig into the second uncured product to reach a surface of the first solid electrolyte layer.

The method for producing a solid electrolyte sheet according to the present invention allows, in the fourth step, the three-dimensional structure to dig into the second uncured product to reach the surface of the first solid electrolyte layer, which enables positioning of the three-dimensional structure.

[3] The method according to [1], wherein the three-dimensional structure is a nonwoven fabric.

In the method for producing a solid electrolyte sheet according to the present invention, even when a nonwoven fabric is used as the three-dimensional structure, it is possible to not only suppress occurrence of wrinkles in the nonwoven fabric and bubbles generated along the wrinkles, but also suppress breakage of the nonwoven fabric.

The embodiment of the present invention can provide a method for producing a solid electrolyte sheet that not only suppresses occurrence of wrinkles in a three-dimensional structure such as a nonwoven fabric and bubbles generated along the wrinkles, but also suppresses breakage of the three-dimensional structure.

DETAILED DESCRIPTION OF THE INVENTION

Hereinbelow, one embodiment of the present invention is described in detail, referring to the annexed drawings.
[Method for Producing Solid Electrolyte Sheet]

FIGS. 1 to 4 are schematic cross-sectional views showing a method for producing a solid electrolyte sheet according to an embodiment of the present invention.

The method for producing a solid electrolyte sheet according to the present embodiment is a method for producing a solid electrolyte sheet filled with a solid electrolyte, which comprises: a first step of applying a first slurry containing a solid electrolyte to a substrate to form a first uncured product of the first slurry; a second step of drying the first uncured product on the substrate to form a first solid electrolyte layer; a third step of applying a second slurry to an upper surface of the first solid electrolyte layer to form a second uncured product of the second slurry; a fourth step of digging a sheet-formed three-dimensional structure into the second uncured product to reach the surface of the first solid electrolyte layer; and a fifth step of drying the second uncured product that has entered inside the three-dimensional structure and the second uncured product that is present on the three-dimensional structure to form a second solid electrolyte layer inside and on the three-dimensional structure, thereby obtaining a solid electrolyte sheet with the second solid electrolyte layer filling inside of the three-dimensional structure.

The method for producing a solid electrolyte sheet according to the present embodiment involves steps including the first step to the fifth step, to thereby produce a sheet material filled with a solid electrolyte, wherein a three-dimensional structure is impregnated with a solid electrolyte-containing slurry.
<First Step>

Figure 1:
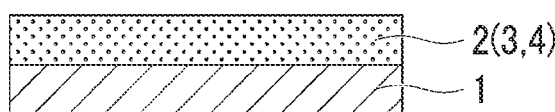
FIG. 1 is a cross-sectional view showing a method for producing a solid electrolyte sheet according to an embodiment of the present invention.

The first step is a step of applying a first slurry 2 containing a solid electrolyte to a substrate 1 to form a first uncured product 3 of the first slurry 2 (see FIG. 1). The first uncured product 3 is composed of the first slurry 2 containing a solid electrolyte, and is a so-called precursor of a solid electrolyte layer that becomes the first solid electrolyte layer 4 when dried. In the method for producing a solid electrolyte sheet according to the present embodiment, a first slurry 2 containing a solid electrolyte is applied onto a removable substrate 1. As a method for applying the first slurry 2 containing the solid electrolyte, a known method can be adopted. Examples of the method for applying the first slurry 2 include a blade coating method, a spraying method, and a sputtering method. The coating thickness of the first slurry 2 containing the solid electrolyte is preferably 2.0 to 4.5 times the thickness of the solid electrolyte sheet after pressing.

The substrate 1 used in the method for producing a solid electrolyte sheet according to the present embodiment is preferably a substrate that has good releasability with respect to the first solid electrolyte layer 4. Further, the substrate 1 having good releasability with respect to the first solid electrolyte layer 4 is preferably one which has a heat resistance such that the substrate is not deformed or damaged due to heat during the drying process for the solid electrolyte-containing first slurry 2 performed in the second and fifth steps.

The first slurry 2 containing the solid electrolyte is not particularly limited as long as it is a slurry containing at least a solid electrolyte capable of conducting lithium ions between the positive electrode and the negative electrode. Examples of such solid electrolytes include oxide electrolytes and sulfide electrolytes. Further, if necessary, the first slurry 2 containing the solid electrolyte may contain other components such as a binder. In this context, when the first slurry 2 containing the solid electrolyte further contains an electrode active material, such a slurry can be applied to the method for producing an electrode layer.

The slurry 1 containing the solid electrolyte preferably contains lithium element. The presence of lithium element in the solid electrolyte can improve lithium ion conductivity.

Specifically, the solid electrolyte is preferably a substance containing at least lithium sulfide and, as a second component, at least one compound selected from the group consisting of silicon sulfide, phosphorus sulfide and boron sulfide, and is particularly preferably $Li_2S$—$P_2S_5$. It is known that such sulfide-based solid electrolytes have higher lithium ion conductivity than other inorganic compounds, and may contain sulfides such as $SiS_2$, $GeS_2$ and $B_2S_3$, as well as $Li_2S$—$P_2S_5$. Further, $Li_3PO_4$, halogens, halogen compounds, etc. may be added to the solid electrolyte as appropriate.

The solid electrolyte may contain a lithium ion conductor formed of an inorganic compound as an inorganic solid electrolyte. Examples of lithium ion conductors include $Li_3N$, LISICON, LIPON ($Li_{3+y}PO^{4-}{}_xN_x$), Thio-LISICON ($Li_{3.25}Ge_{0.25}P_{0.75}S_4$), and $Li_2O$—$Al_2O_3$—$TiO_2$—$P_2O_5$ (LATP).

The solid electrolyte may be of any structure such as amorphous, glass, or crystal (crystallized glass). When the solid electrolyte is a sulfide solid electrolyte consisting of $Li_2S$—$P_2S_5$, the lithium ion conductivity of its amorphous form is $10^{-4}$ $Scm^{-1}$. On the other hand, the lithium ion conductivity of the crystalline form is $10^{-3}$ $Scm^{-1}$.

The solid electrolyte used in the method for producing a solid electrolyte sheet according to the present embodiment preferably contains at least one of phosphorus and sulfur. When the solid electrolyte further contains at least one of phosphorus and sulfur, the ionic conductivity of the obtained solid electrolyte sheet can be improved.
<Second Step>

The second step is a step of drying the first uncured product 3 of the solid electrolyte-containing first slurry 2 coated on the substrate 1 using a drying device to form a first solid electrolyte layer 4 (see FIG. 1).

With respect to the method for forming the first solid electrolyte layer 4 by drying the first uncured product 3 of the first slurry 2 containing the solid electrolyte, which is applied to the substrate 1, any drying method may be used as long as the shape of the solid electrolyte-containing slurry applied in the form of a thin film does not collapse during heating, and any known method may be used. For example, it is possible to employ a method in which the substrate 1 and the solid electrolyte-containing first slurry 2 (first uncured product 3) applied to the substrate 1 are placed on a hot plate and heated so as to dry the solid electrolyte-containing first slurry 2 (first uncured product 3), or a method using an electric furnace or other known drying device instead of a hot plate.

<Third Step>

Figure 2:
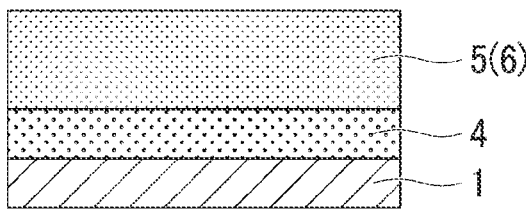
FIG. 2 is a cross-sectional view showing a method for producing a solid electrolyte sheet according to an embodiment of the present invention.
Figure 3:
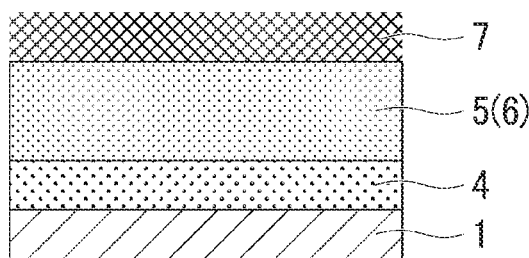
FIG. 3 is a cross-sectional view showing a method for producing a solid electrolyte sheet according to an embodiment of the present invention.
Figure 4:
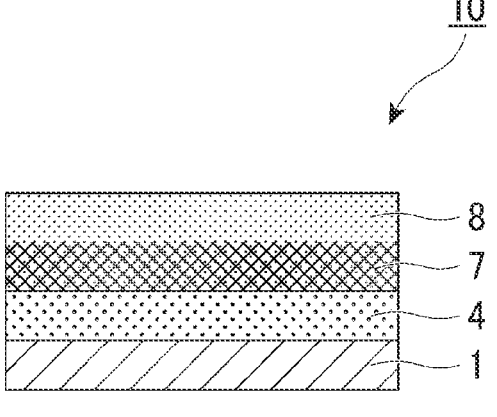
FIG. 4 is a cross-sectional view showing a method for producing a solid electrolyte sheet according to an embodiment of the present invention.

The third step is a step of applying a second slurry 5 to an upper surface of the first solid electrolyte layer 4 formed in the second step to form a second uncured product 6 of the second slurry 5 (see FIG. 2). The second uncured product 6 is composed of the second slurry 5 containing a solid electrolyte, and is a so-called precursor of a solid electrolyte layer that becomes the second solid electrolyte layer when dried. In the method for producing a solid electrolyte sheet according to the present embodiment, the second slurry 5 containing the solid electrolyte is applied to the upper surface of the first solid electrolyte layer 4. As a method for applying the second slurry 5 containing the solid electrolyte, the same method as in the first step can be used. The coating thickness of the slurry containing the solid electrolyte is preferably 2.0 to 4.5 times the thickness of the solid electrolyte sheet after pressing. The second slurry 5 may be the same as or different from the first slurry 2. When the second slurry 5 is different from the first slurry 2, for example, it is possible to use one that easily enters inside the three-dimensional structure 7 described below.

<Fourth Step>

The fourth step is a step of digging a sheet-formed three-dimensional structure 7 into the second uncured product 6 formed in the second step. As a method for digging the three-dimensional structure 7 into the second uncured product 6, a known method can be adopted. Examples of such methods include a method in which the three-dimensional structure 7 is placed on the upper surface of the second uncured product 6, and is allowed to dig into the second uncured product 6 by its own weight. Another example is a method in which a laminate of the substrate 1, the first solid electrolyte layer 4, and the second uncured product 6 shown in FIG. 3 and the three-dimensional structure 7 are brought into contact with a conveyance roll, so as to actively cause the three-dimensional structure 7 to dig into the second uncured product 6. In the fourth step, it is preferable that the sheet-formed three-dimensional structure 7 is allowed to dig into the second uncured product 6 to reach the surface of the first solid electrolyte layer 4. This enables positioning of the three-dimensional structure 7.

The three-dimensional structure 7 used in the method for producing a solid electrolyte sheet according to the present embodiment is a porous sheet having a plurality of openings on the surface and a plurality of voids inside. Examples of porous sheets include meshes, woven fabrics, nonwoven fabrics, embossed bodies, punched bodies, expanded bodies, and foams, among which nonwoven fabrics are preferred. When the three-dimensional structure 7 is a nonwoven fabric, the solid electrolyte-containing slurry can be rapidly impregnated into the three-dimensional structure 7 in the method for producing a solid electrolyte sheet according to the present embodiment, thereby allowing easy reduction of the production cost related to impregnation.

The material of the three-dimensional structure 7 is not particularly limited as long as it is a sheet material that can provide a self-supporting solid electrolyte sheet. Examples thereof include polyethylene terephthalate, nylon, aramid, alumina ($Al_2O_3$), glasses, and metals. In this context, when a non-conductive material such as polyethylene terephthalate, nylon, aramid, alumina, glass, etc. is used as the material of the three-dimensional structure 7, such a material can be applied to the method for producing a solid electrolyte sheet. Further, when a conductive material such as a metal is used as the material of the three-dimensional structure 7, such a material can be applied to the method for producing an electrode layer.

The porosity of the three-dimensional structure 7 is preferably 60% to 95%. The porosity of the three-dimensional structure 7 is more preferably 70% to 90%, even more preferably 80% to 90%.

The thickness of the three-dimensional structure 7 is preferably 5 μm to 30 μm. The thickness of the three-dimensional structure 7 is more preferably 5 μm to 20 μm, even more preferably 10 μm to 20 μm. When the thickness of the three-dimensional structure 7 is less than 5 μm, there is a risk of short circuit between the electrodes in the produced battery. On the other hand, when the thickness of the three-dimensional structure 7 exceeds 30 μm, application of the solid electrolyte-containing slurry to the three-dimensional structure 7 may become difficult, so that it may become difficult to provide a solid electrolyte sheet with high energy density.

<Fifth Step>

The fifth step is a step of drying the second uncured product 6 that has entered inside the three-dimensional structure 7 and the second uncured product 6 that is present on the three-dimensional structure 7 to form a second solid electrolyte layer 8 inside and on the three-dimensional structure 7. This step allows inside of the three-dimensional structure 7 to be filled with the second solid electrolyte layer 8, and results in a solid electrolyte sheet 10 in which the first solid electrolyte layer 4 and the second solid electrolyte layer 8 are integrated (see FIG. 4).

With respect to the method for forming the second solid electrolyte layer 8 by drying the second uncured product 6 that has entered the interior of the three-dimensional structure 7 and the second uncured product 6 that is present on the three-dimensional structure 7, as in the second step, any drying method may be used as long as the shape of the solid electrolyte-containing slurry applied in the form of a thin film does not collapse during heating, and any known method may be used.

Further, after drying in the fifth step, the removable substrate for the obtained solid electrolyte sheet may or may not be removed until it is used as a battery part in the production of a solid-state battery. Further, after pressing the solid electrolyte sheet, a positive electrode layer, the solid electrolyte sheet, and a negative electrode layer are stacked one upon the other in this order and the resulting is pressurized, thereby producing a solid-state battery. Alternatively, a solid-state battery can also be produced by stacking a positive electrode layer, a solid electrolyte sheet, and a negative electrode layer one upon the other in this order, and pressing the resulting.

In the method for producing a solid electrolyte sheet according to the present embodiment, by adjusting the thickness of the first uncured product 3 and the thickness of the second uncured product 6, the three-dimensional structure 7 can be placed at a predetermined position in the thickness direction of the solid electrolyte sheet 10.

The method of the present invention can be applied not only to a method for producing a solid electrolyte sheet as described above, but also to a method for producing sheet materials containing solid electrolytes such as electrode layers with various additions, modifications or omissions that do not deviate from the spirit of the present invention.

[Solid Electrolyte Sheet]

The solid electrolyte sheet according to an embodiment of the present invention has: a sheet-formed three-dimensional structure having its inside filled with a solid electrolyte; and a solid electrolyte layer formed to cover the upper and lower surfaces of the three-dimensional structure, respectively. More specifically, the solid electrolyte sheet according to the present embodiment is a solid electrolyte sheet produced by the method for producing a solid electrolyte sheet according to the above-described embodiment. For the solid electrolyte layer and the three-dimensional structure, electrode materials that can be used in the above-described method for producing a solid electrolyte sheet can be preferably used.

Figure 5:
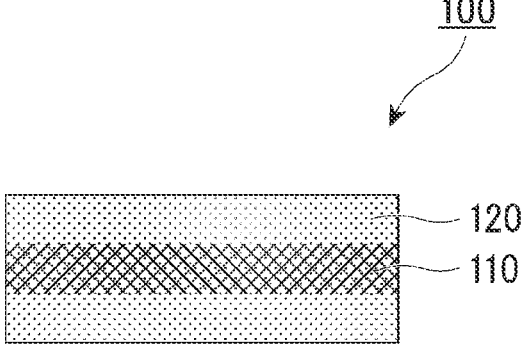
FIG. 5 is a cross-sectional view showing a solid electrolyte sheet according to an embodiment of the present invention.

FIG. 5 is a cross-sectional view showing a solid electrolyte sheet according to the present embodiment.

As shown in FIG. 5, the solid electrolyte sheet 100 according to the present embodiment has: a sheet-formed three-dimensional structure 110, which is placed at an approximately middle position in the thickness direction and has its inside filled with a solid electrolyte; and a solid electrolyte layer 120 formed to cover the upper and lower surfaces of the three-dimensional structure 110, respectively. Therefore, when the solid electrolyte sheet 100 is applied to a solid-state battery, the lithium ions moving from the positive electrode toward the negative electrode can move through the three-dimensional structure 110 positioned at an approximately middle in the thickness direction, so that the movement is not be significantly hindered, and the speed of movement does not decrease significantly. As a result, the lithium ions can be inserted into and desorbed from the electrodes more smoothly than the conventional techniques, thereby improving the battery output performance.

Thus, according to the method for producing a solid electrolyte sheet and the solid electrolyte sheet according to the present embodiments, lithium ions can be smoothly inserted into and desorbed from the electrodes through the solid electrolyte layer, so that the battery output performance can be improved, and the binding strength between the electrolyte layer and the electrode layers can also be improved, thereby allowing suppression of delamination and short circuit between the solid electrolyte layer and the electrode layers.

The solid electrolyte sheet of the present embodiment can be pressed and applied to a solid-state battery as a solid electrolyte layer.

The present invention is not limited to the above embodiment, and such modifications and improvements as would allow the object of the present invention to be achieved are included in the present invention.

What is claimed is:

1. A method for producing a solid electrolyte sheet filled with a solid electrolyte, the method comprising:
   a first step of applying a first slurry containing a solid electrolyte to a substrate to form a first uncured product of the first slurry;
   a second step of drying the first uncured product on the substrate to form a first solid electrolyte layer;
   a third step of applying a second slurry to an upper surface of the first solid electrolyte layer to form a second uncured product of the second slurry;
   a fourth step of digging a sheet-formed three-dimensional structure into the second uncured product; and
   a fifth step of drying the second uncured product that has entered inside the three-dimensional structure and the second uncured product that is present on the three-dimensional structure to form a second solid electrolyte layer inside and on the three-dimensional structure, thereby obtaining a solid electrolyte sheet with the second solid electrolyte layer filling inside of the three-dimensional structure.

2. The method according to claim 1, wherein in the fourth step, the three-dimensional structure is allowed to dig into the second uncured product to reach a surface of the first solid electrolyte layer.

3. The method according to claim 1, wherein the three-dimensional structure is a nonwoven fabric.

4. The method according to claim 1, wherein the three-dimensional structure has a thickness of 5 $\mu$m to 30 $\mu$m.

* * * * *